United States Patent [19]

Nagano

[11] Patent Number: 5,312,166
[45] Date of Patent: May 17, 1994

[54] QUICK RELEASE MECHANISM HAVING A TIGHTENING FORCE INDICATOR

[75] Inventor: Masashi Nagano, Izumi, Japan

[73] Assignee: Shimano Inc., Osaka, Japan

[21] Appl. No.: 926,705

[22] Filed: Aug. 10, 1992

[51] Int. Cl.[5] .............................................. B60B 27/02
[52] U.S. Cl. .................. 301/110.5; 301/111; 411/8; 403/27
[58] Field of Search .............. 301/111, 114, 105.1, 301/110.5, 124.1; 411/8, 9, 10; 403/27; 116/67 R; 70/223, 225

[56] References Cited

U.S. PATENT DOCUMENTS

| | | | |
|---|---|---|---|
| 3,474,701 | 10/1969 | Setzler | 411/8 |
| 4,292,000 | 9/1981 | Baldwin et al. | 403/27 |
| 4,724,692 | 2/1988 | Turin et al. | 70/225 |
| 4,906,053 | 3/1990 | Kawai | 301/105 B |
| 4,917,525 | 4/1990 | Duncan | 403/27 |
| 5,007,602 | 4/1991 | Carlsson | 116/67 R X |

FOREIGN PATENT DOCUMENTS

| | | | |
|---|---|---|---|
| 0486002A1 | 5/1992 | European Pat. Off. | |
| 501304 | 11/1954 | Italy | 301/105 B |
| 56-304 | 6/1954 | Japan. | |
| 2231163 | 11/1990 | United Kingdom. | |

Primary Examiner—Russell D. Stormer
Attorney, Agent, or Firm—Dickstein, Shapiro & Morin

[57] ABSTRACT

A quick release mechanism for tightening a hub assembly having a tubular shaft between prongs of a bicycle frame fork. This mechanism includes a tightening rod extending axially through the tubular rod, a first clamp and a second clamp mounted on the tightening rod, and a control lever mounted on the tightening rod for moving the clamps between a tightening position and a release position. This mechanism further includes a device for indicating that the tightening force applied from the first and second clamps exceeds a predetermined value. The indicating device includes a shift member shiftable between a first position and a second position, a receiving member for receiving the tightening force from the clamps through the frame fork, an interlocking member for shifting the shift member to the second position when the receiving member receives a force exceeding the predetermined value, and a spring for urging the shift member to the first position. The indicating device outputs a message through the medium of sound or light when the shift member is shifted to the second position.

10 Claims, 8 Drawing Sheets

QUICK RELEASE MECHANISM HAVING A TIGHTENING FORCE INDICATOR

BACKGROUND OF THE INVENTION

1. Field of the Invention

The present invention relates to a quick release mechanism for use in fixing a hub assembly to a frame fork of a bicycle, for example, which basically includes a tightening rod extending axially, a first clamp mounted on one end of the tightening rod and a second clamp mounted on the other end thereof to be axially movable relative thereto between a tightening position and a release position, and a control lever mounted on the tightening rod for moving the clamps between the tightening position and release position.

2. Description of the Related Art

In a conventional quick release mechanism of this type, its tightening condition is confirmed by visually observing positions of the clamps.

An example of an improvement of this kind of mechanism is disclosed in U.S. Pat. No. 4,724,692 which includes a nut acting as a clamp, in which the nut is movable relative to a tightening rod when a tightening force applied by clamps reaches a predetermined value. This displacement of the nut provides a visual means to confirm that the tightening force reached a predetermined value.

SUMMARY OF THE INVENTION

The object of the present invention is to provide a quick release mechanism that allows a bicycle operator to audibly confirm a desired tightening condition.

The above object is fulfilled, according to the present invention, by a quick release mechanism for a bicycle described in the outset hereof which includes a device for indicating that a desired tightening force is applied from the first and second clamps. This indicating device gives a message to the operator through the medium of sound or light. Where a sound is used, in particular, the operator may determine adequacy or inadequacy of the tightening condition without observing the quick release mechanism.

This indicating device may be a mechanical and/or electrical device. In a preferred embodiment of the present invention where the quick release mechanism is employed in fixing a hub assembly to a bicycle frame fork, the indicating device includes a shift member shiftable between a position to contact the hub assembly and a non-contact position, a receiving member for receiving the tightening force from the clamps through the frame fork, and an interlocking member for shifting the shift member to the non-contact position when the receiving member receives a force exceeding a predetermined value. The shift member and hub assembly have mutually contacting portions for producing a sound with rotation of the hub assembly.

In this construction, when the hub assembly is rotated, a sound is produced as long as the quick release mechanism is in an unsatisfactory tightening condition. Thus, the operator is capable of grasping the tightening condition audibly.

Other features and advantages of the present invention will be apparent from the description of the preferred embodiments to be had with reference to the drawings.

DETAILED DESCRIPTION OF THE PREFERRED EMBODIMENTS

Figure 1:
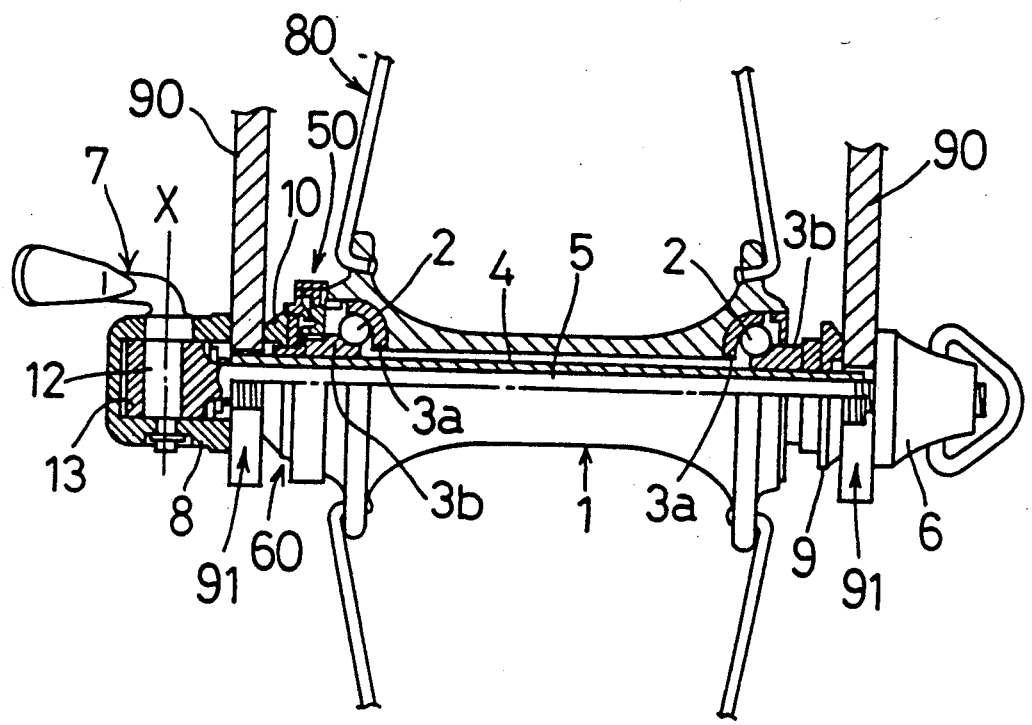
FIG. 1 is a front view, partly in section, of a quick release mechanism in a first embodiment of the present invention.

As shown in FIG. 1, a hub assembly 1 is rotatably supported on a tubular shaft 4 through bearing balls 2, outer races 3a and inner races 3b disposed in opposite end regions of the hub assembly 1. A tightening rod 5 extends axially through the tubular shaft 4. A first clamp 6 is axially movably mounted on one end of the tightening rod 5 projecting from one end of the tubular shaft 4. A second clamp 8 is adjustably fixed to the other end of the tightening rod 5 projecting from the other end of the tubular shaft 4. The second clamp 8 includes a lever type control device 7 which is itself known. This control device 7 utilizes cam action in converting a turning operation of a lever into a force for pulling the tightening rod 5 to tighten the hub assembly 1, and thus a wheel 80, to a front frame fork of a bicycle. The hub assembly 1 is loosened by opposite turning of the lever.

Figure 2:
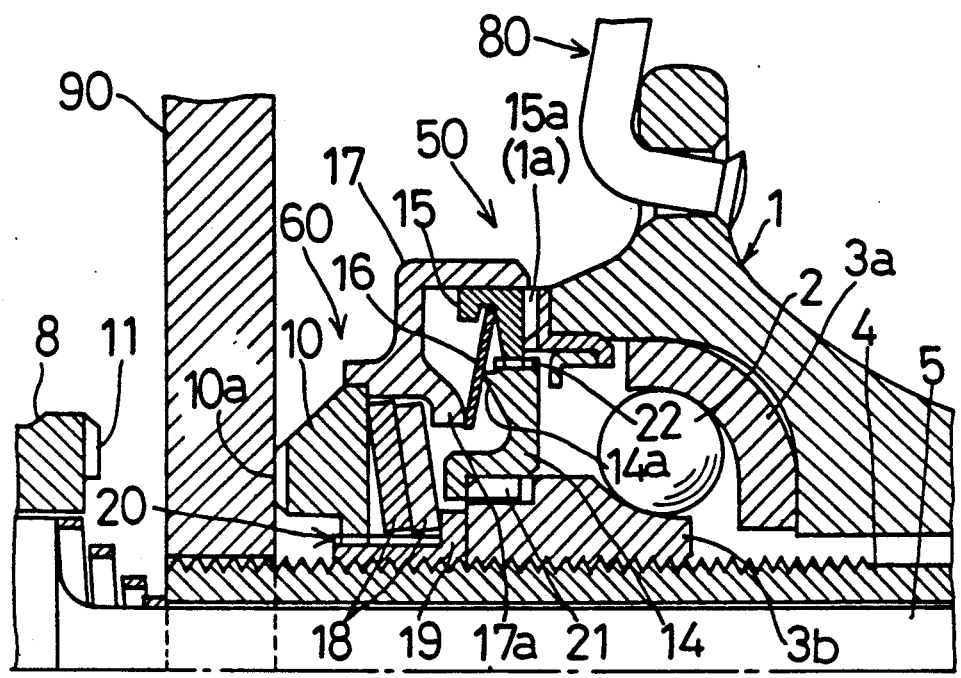
FIG. 2 is a sectional view of a sounding ring mounting structure of the quick release mechanism shown in FIG. 1.

Specifically, the tubular shaft 4 carries a lock nut 9 meshed with one end thereof to fix the inner race 3b in place, and one prong of the frame fork 90 between the first clamp 6 and lock nut 9. As shown in FIG. 2, the tubular shaft 4 carries a rotation stopper 10 mounted on the other end thereof, with the other prong of the frame fork 90 disposed between the second clamp 8 and rotation stopper 10. The fork 90 includes cutouts 91 defined in lower ends thereof and opening downwardly for attaching the tubular shaft 4.

The second clamp 8 includes a contact portion 11 defined on a radial surface opposed to the fork 90. With an axial shift of the second clamp 8, the contact portion 11 contacts and presses on the fork 90. When the lever of the control device 7 is turned about an axis X, a rotary cam 12 rotatable with the lever acts on a cam follower 13 provided at the other end of the tightening rod 5, thereby to move the tightening rod 5 axially relative to the second clamp 8. This results in a change in the distance between the first clamp 6 and second clamp 8. In this way, the hub assembly 1 is tightened between the opposite prongs of the fork 90 and loosened from the fork 90.

That is, the hub assembly 1 including the wheel 80 is inserted into the cutouts of the fork 90, and then the lever of the control device 7 is turned. The resulting tightening action of the first clamp 6 and second clamp 8 securely connects the front fork 90 and wheel 80 for use of the bicycle. The front fork 90 and wheel 80 may be loosened by operating the control device 7 in the opposite direction, whereby the wheel 80 becomes detachable from the front fork 90.

Figure 4:
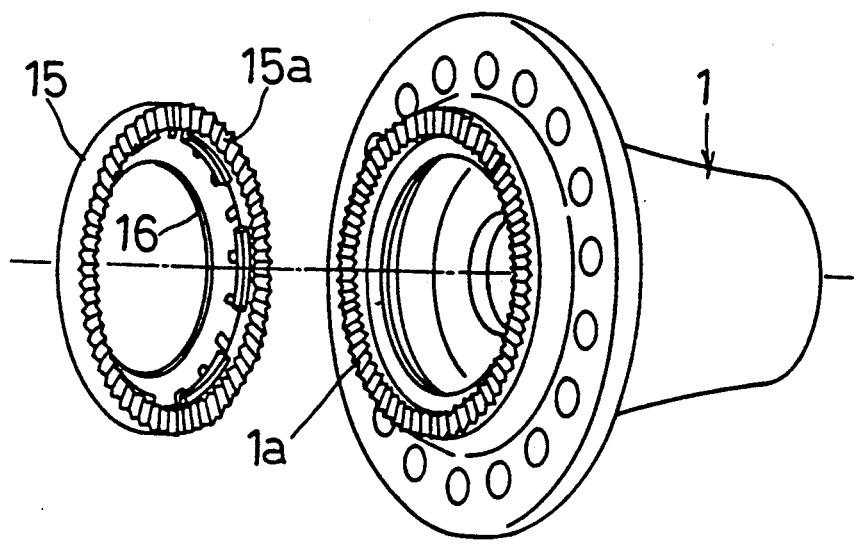
FIG. 4 is a perspective view of the sounding ring included in the quick release mechanism shown in FIG. 1.

Referring to FIG. 2, the left inner race 3b carries, through a plastic mounting ring 14, a plastic sound ring 15 as shown in FIG. 4. When the control device 7 is operated to tighten and loosen the fork 90 and hub assembly 1, the sound ring 15 is selectively switched between an operative state and an inoperative state through an interlocking device 60 including the rotation stopper 10. The sound ring 15 is maintained in the operative state unless the front fork 90 and hub assembly 1 are tightened together in a desired condition by the first clamp 6 and second clamp 8. The sound ring 15 in the operative state produces a sound with rotation of the wheel 80. When the desired tightening condition is achieved, the sound ring 15 is switched to the inoperative state to produce no sound. The components playing parts in producing the sound in the tightening condition are collectively called herein an indicating device 50. This indicating device 50 allows the operator to determine accurately and easily whether the wheel 80 is secured to the fork 90 in a desired condition.

A detailed structure of the indicating device 50 will be described hereinafter. The interlocking device 60 includes the rotation stopper 10, a switching plate 16 in the form of a plate spring attached to the sound ring 15, and an annular control element 17 axially shiftable by the tightening force to switch the sound ring 15 through the switching plate 16 between an operative position and an inoperative position. The control element 17 is movable with the rotation stopper 10, and is formed of a plastic material to act also as a dust cover of the indicating device 50. The interlocking device 60 further includes a disk spring 18 for urging the rotation stopper 10, and thus the control element 17, leftward in FIG. 2. Consequently, the switching plate 16 is maintained in a position to place the sound ring 15 in the operative position. The rotation stopper 10 is set to the tubular shaft 4 to be slidable axially of the hub assembly 1 relative to a locking element 19 locking the inner race 3b.

When the fork 90 and wheel 80 are not yet tightened in a desired condition, as shown in FIG. 2, the rotation stopper 10 is slid away from the inner race 3b by the urging force of the disk spring 18. In this position the control element 17 does not press on the switching plate 16. The switching plate 16 acts on the sound ring 15 by means of its resilience or self-restoring force and a support from a fulcrum portion 14a of the mounting ring 14. As a result, the sound ring 15 is maintained in the operative state with a rugged side surface 15a thereof contacting a rugged plastic surface 1a of the hub assembly 1 (FIG. 2).

Figure 3:
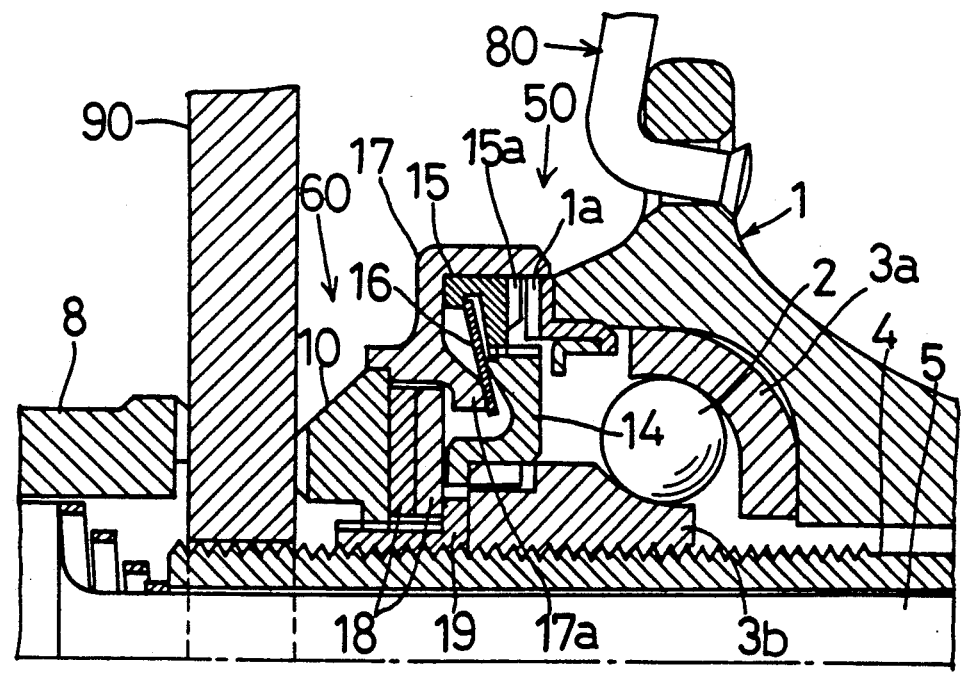
FIG. 3 is a view corresponding to FIG. 2 and showing an inoperative state of a sounding ring.

When the fork 90 and wheel 80 are tightened in the desired condition, as shown in FIG. 3, the rotation stopper 10 is slid toward the inner race 3b by the contact with the front fork 90 and an increased tightening force. Then, the control element 17 through its operating point 17a presses on an inside periphery of the switching plate 16. As a result, the switching plate 16 switches the sound ring 15 to the inoperative position through cooperation of the control element 17 and fulcrum portion 14a.

The sound ring 15 is locked against rotation when the wheel 80 is attached, whether tightened sufficiently or not. This is achieved through a non-rotatable engagement between a knurled surface 10a of the rotation stopper 10 and the front fork 90, a non-rotatable engagement through a spline structure 20 between the rotation stopper 10 and locking element 19, a non-rotatable engagement through a meshing structure between the inner race 3b and mounting ring 14, and a non-rotatable engagement through a spline structure 22 between the mounting ring 14 and sound ring 15. Consequently, the sound ring 15 in the operative position produces a sound with rotation of the wheel 80, from the contact between the rugged side surface 15a of the sound ring 15 and the rugged surface 1a of the hub assembly 1. When the sound ring 15 is in the inoperative position with the rugged side surface 15a separated from the rugged surface 1a, no sound is produced even if the wheel 80 is rotated.

Thus, the indicating device 50 has the sound ring 15 maintained in the operative state as long as a tightening amount by the first clamp 6 and second clamp 8 is less than a predetermined amount (FIG. 2). In this state, a contact sound is produced as a result of rotation of the hub assembly 1, to notify inadequacy of tightening. When the tightening amount reaches the predetermined amount by operation of the control device 7, the sound ring 15 is switched to the inoperative state (FIG. 3). Then, the sound is no longer produced, to notify completion of the tightening operation.

Figure 5:
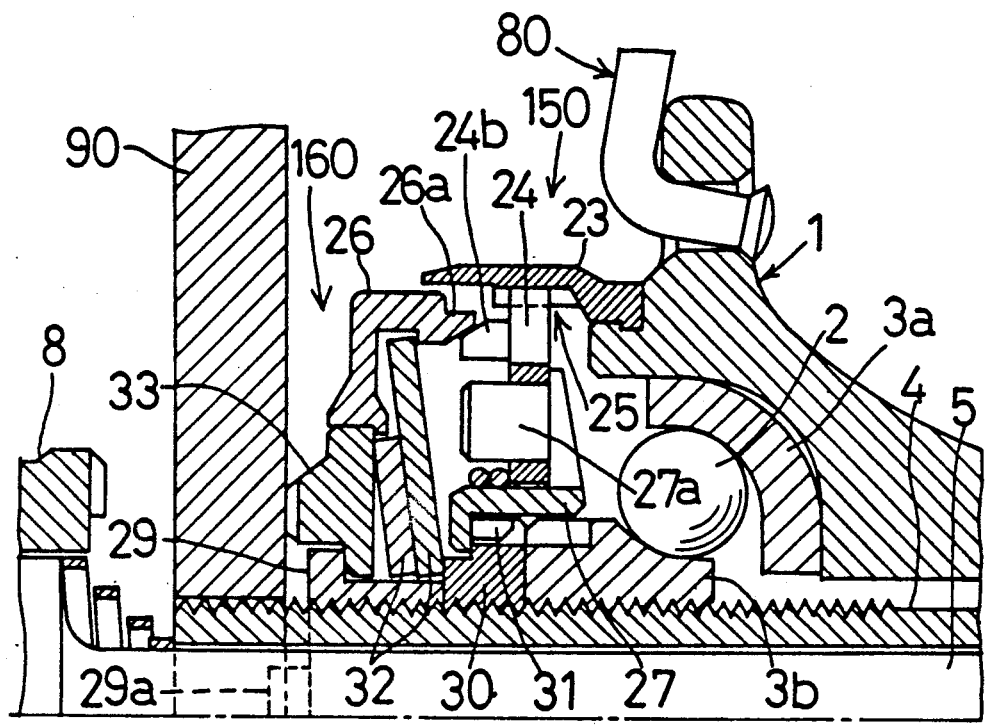
FIG. 5 is a sectional view of an indicating device of the quick release mechanism in a second embodiment of the present invention.
Figure 6:
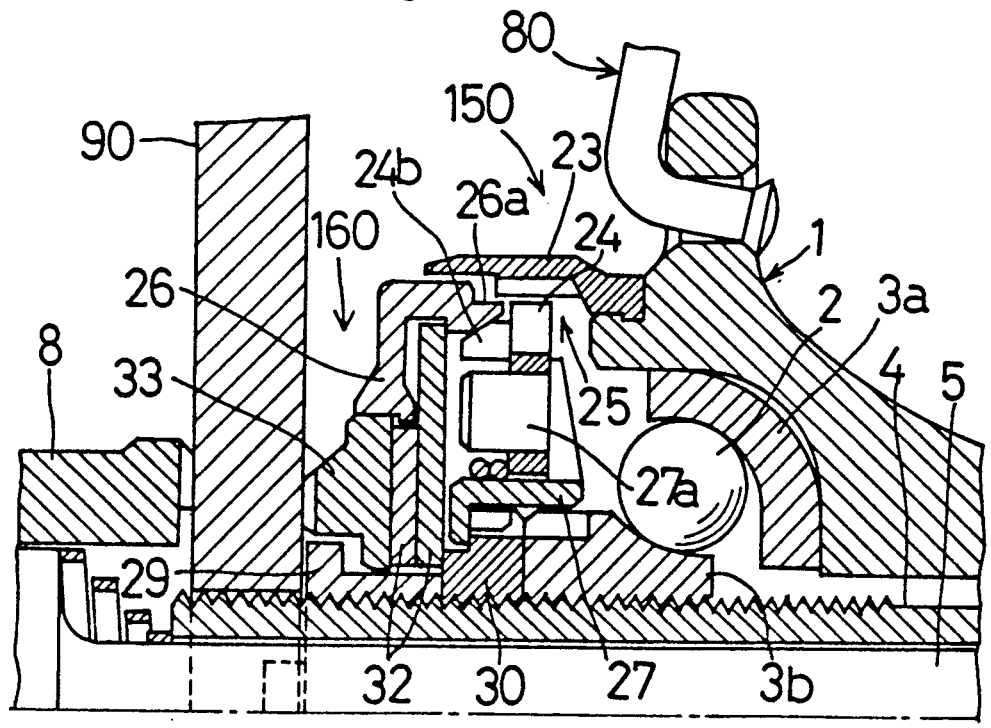
FIG. 6 is a view corresponding to FIG. 5 and showing an inoperative state of the indicating device.

FIGS. 5 and 6 show an indicating device 150 in a second embodiment of the invention. This indicating device 150 includes a sound mechanism 25 having a ring-shaped bell 23 and hammers 24. An interlocking device 160 in this embodiment includes a plastic control element 26 for controlling the hammers 24.

Figure 7:
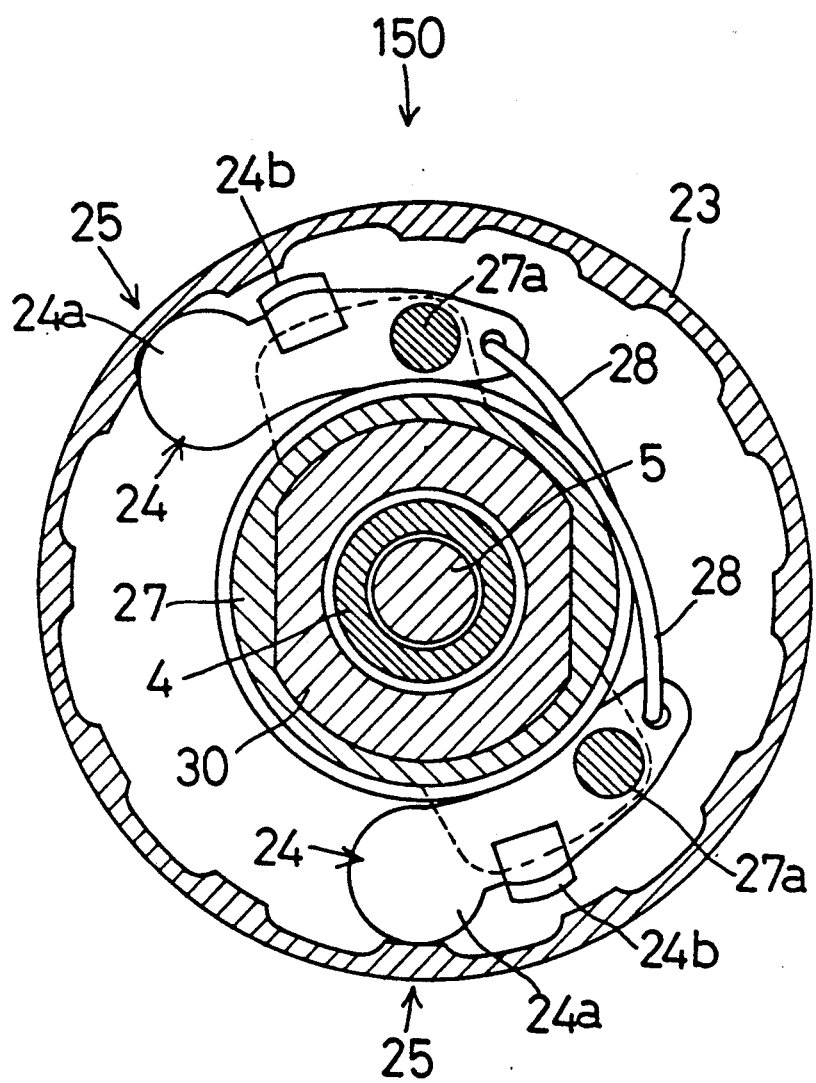
FIG. 7 is a side view of a hammer mounting structure in the quick release mechanism shown in FIG. 1.

The bell 23 is press fit to an end of a hub barrel of the hub assembly 1 to be rotatable therewith. The hammers 24 are pivotably supported by a support ring 27 through support pins 27a, respectively. As shown in FIG. 7, the hammers 24 are urged by a spring 28 to have respective operating portions 24a thereof contact the bell 23. The hammers 24 do not revolve with rotation of the hub assembly 1 when the wheel 80 is attached. This is achieved through a non-rotatable engagement between the fork 90 and an axial projection 29a formed on an inner race locking element 29, and an engagement through a spline structure 31 between the lock nut 30 and support ring 27. As shown in FIG. 5, the control element 26 includes a control portion 26a opposed to the hammers 24 and engageable with controlled elements 24b fixed to the respective hammers 24. The control portion 26a and controlled elements 24b define appropriately inclined surfaces, whereby axial movement of the control element 26 causes pivotal movement of the hammers 24. When the control portion 26a is in a non-pressing position away from the controlled elements 24b of the hammers 24, the hammers 24 pivot under the force of spring 28 to have the operating portions 24a contact the bell 23. Then, with rotation of the wheel 80, the hammers 24 repeatedly strike a rugged inner periphery of the bell 28 as shown in FIG. 7, thereby producing a sound.

When the control element 26 moves axially rightward as shown in FIG. 6, the control portion 26a contacts the controlled elements 24b of the hammers 24 to depress the hammers 24 out of contact with the bell 23. Then, no sound is produced even if the wheel 80 is rotated.

With this interlocking device 160, when a tightening amount by the first clamp 6 and second clamp 8 is less than a predetermined amount, the control element 26 is stopped by a disk spring 32 from moving to the position to depress the hammers 24. Consequently, the hammers 24 are capable of contacting the bell 23, and the sound is produced with rotation of the wheel 80. When the tightening amount by the first clamp 6 and second clamp 8 reaches the predetermined amount, a control element supporter 33 contacts the front fork 90, and the tightening force overcoming the spring 32 moves the supporter 33, and thus the control element 26, toward the hammers 24. As a result, the hammers 24 are depressed out of contact with the bell 23.

In this embodiment, a contact sound is produced between the bell 23 and hammers 24 as a result of wheel rotation, to notify inadequacy of tightening. The operator may confirm completion of the tightening operation from termination of this sound.

Figure 8:
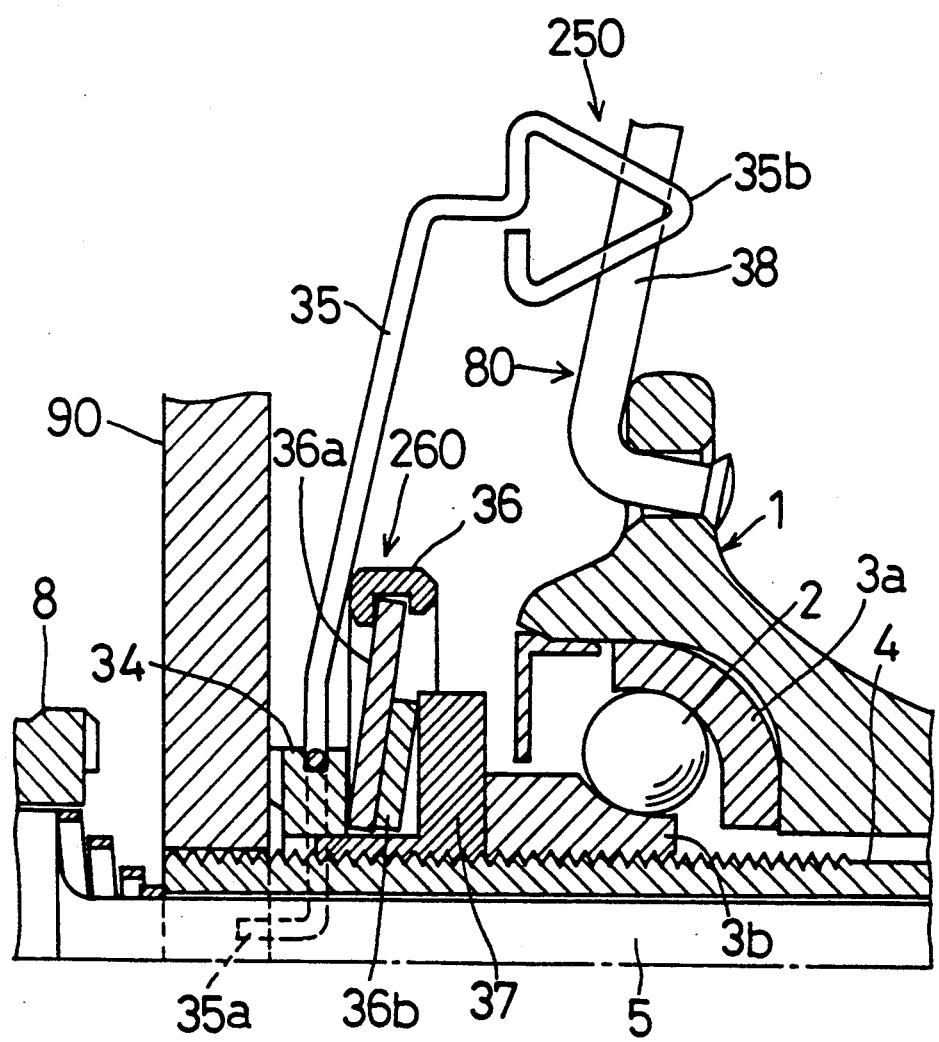
FIG. 8 is a sectional view of an indicating device of the quick release mechanism in a third embodiment of the present invention.
Figure 9:
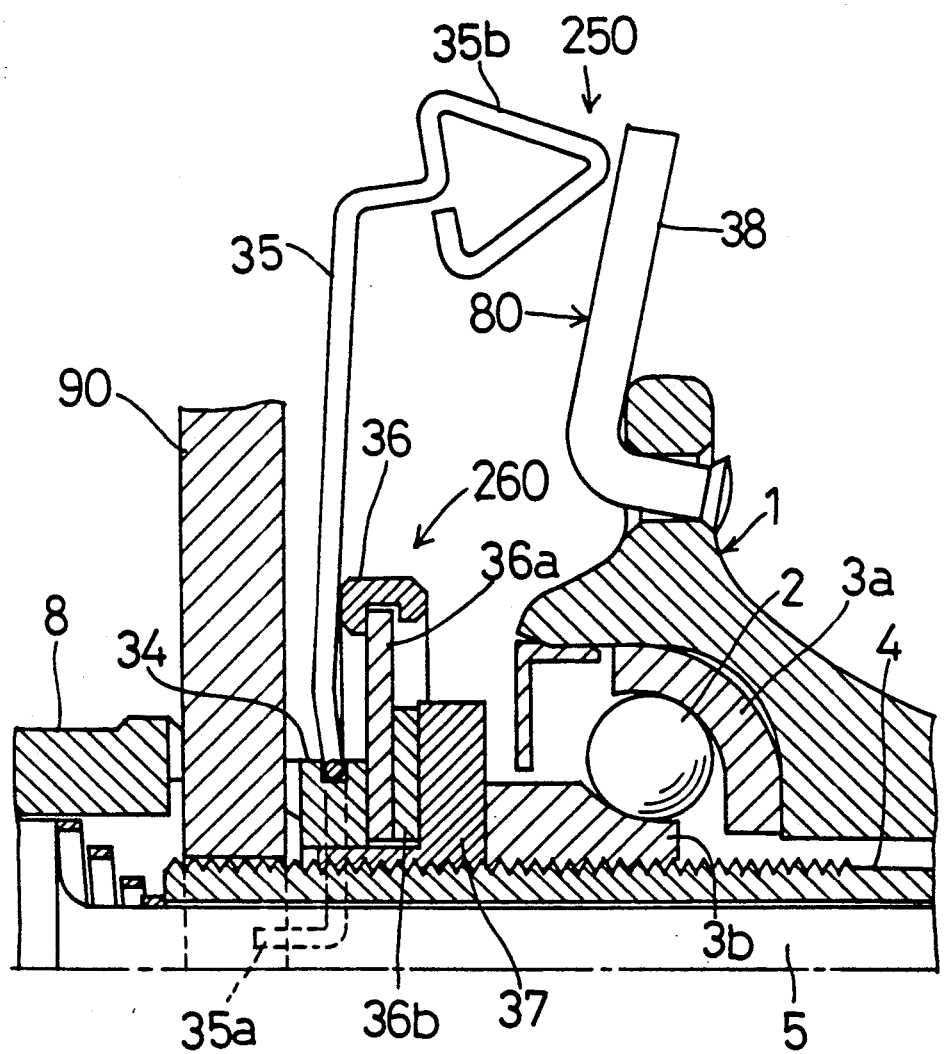
FIG. 9 is a view corresponding to FIG. 8 and showing an inoperative state of the indicating device.

FIG. 8 shows an indicating device 250 in a third embodiment of the invention. This indicating device 250 includes a wire projection 35 extending radially outwardly from a support ring 34 slidably mounted on an inner race locking element 37 fixed to the tubular shaft 4. An interlocking device 260 in this embodiment includes an annular plastic control element 36 for contacting the projection 35, a switching plate 36a in the form of a disc spring disposed between the annular control element 36 and inner race locking element 37, and the support ring 34 slidable on the locking element 37 to act on the switching plates 36a. According to this embodiment, when a tightening amount by the first clamp 6 and second clamp 8 is less than a predetermined amount, the supporting ring 34 lies away from the inner race locking element 37 under the resilient restoring force of the switching plate 36a and the urging force of a disc spring 36b as shown in FIG. 8.

When the tightening amount by the first clamp 6 and second clamp 8 reaches the predetermined amount, the support ring 34 in contact with the fork 90 slides toward the locking element 37 under the increased tightening force. As a result, projection 35 pivots about a side surface of the control element 36 acting as a fulcrum. The projection 35 includes a curved proximal end 35a engaging the cutout of the fork 90 whereby the projection 35 is not pivotable about the tubular shaft 4. Further, the projection 35 has a distal end 35b bent into a triangular form, which is shiftable, by a relative positional relationship between the support ring 34 and control element 36, between a position to interfere with spokes 38 of the wheel 80 in rotation and a retracted, non-interfering position. Thus, when the tightening amount is less than the predetermined amount, the distal end 35b of the projection 35 lies in the position to interfere with the spokes 38, thereby producing a contact sound with rotation of the wheel 80. When the tightening amount reaches the predetermined amount, the distal end 35b of the projection 35 is retracted to the non-interfering position to produce no sound with rotation of the wheel 80.

In this embodiment, a contact sound is produced between the projection 35 and the spokes 38 as a result of wheel rotation, to notify inadequacy of tightening. The operator may confirm completion of the tightening operation from termination of this sound.

Figure 10:
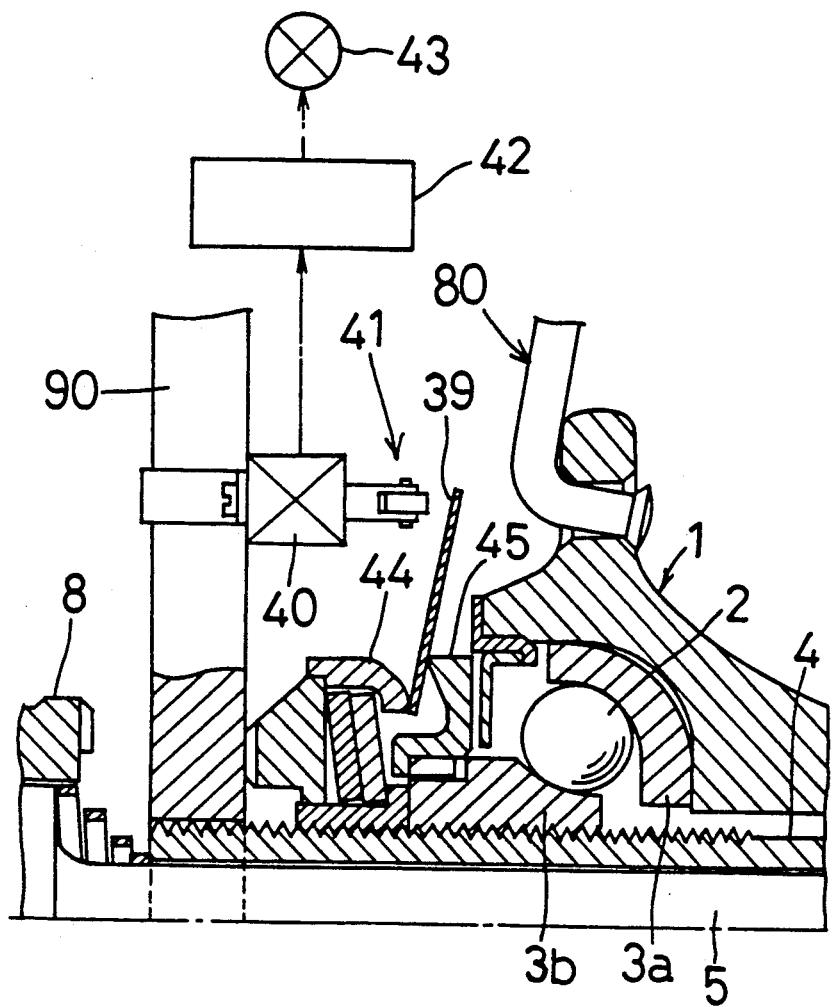
FIG. 10 is a sectional view of an indicating device of the quick release mechanism in a fourth embodiment of the present invention.

FIG. 10 shows a fourth embodiment which includes a detecting device 41 having a combination of a sensor plate 39 and a detection switch 40, an evaluating device 42 for evaluating a signal transmitted from the detecting device 41, and a warning device 43 for giving an alarm based on a result of evaluation received from the evaluating device 42. The detecting device 41 corresponds to the interlocking device in the preceding embodiments. The evaluating device 42 and warning device 43 together correspond to the indicating device in the preceding embodiments.

When a tightening amount by the first clamp 6 and second clamp 8 is less than a predetermined amount, the sensor plate 39 with its own resilience lies in an inoperative position relative to the detecting switch 40. When the tightening amount reaches the predetermined amount, the sensor plate 39 is angularly shifted, by pressure from a plate control element 44 and a fulcrum provided by a support element 45, from the inoperative position to an operative position to press on the detecting switch 40.

Thus, in this embodiment, a tightening condition is detected based on a posture of the sensor plate 39, and the result of detection is electrically obtained by means of the detecting switch 40. The evaluating device 42 determines whether the tightening condition is satisfactory or not, based on the detection information received from the detecting device 41. If the evaluating device 42 decides that the tightening condition is not satisfactory, a bell, buzzer or lamp acting as the warning device 43 indicates the inadequate tightening by means of a sound, light or color. When a sufficient tightening condition is attained, the warning device 43 stops operating or gives an indication with a different sound, light or color.

Figure 11:
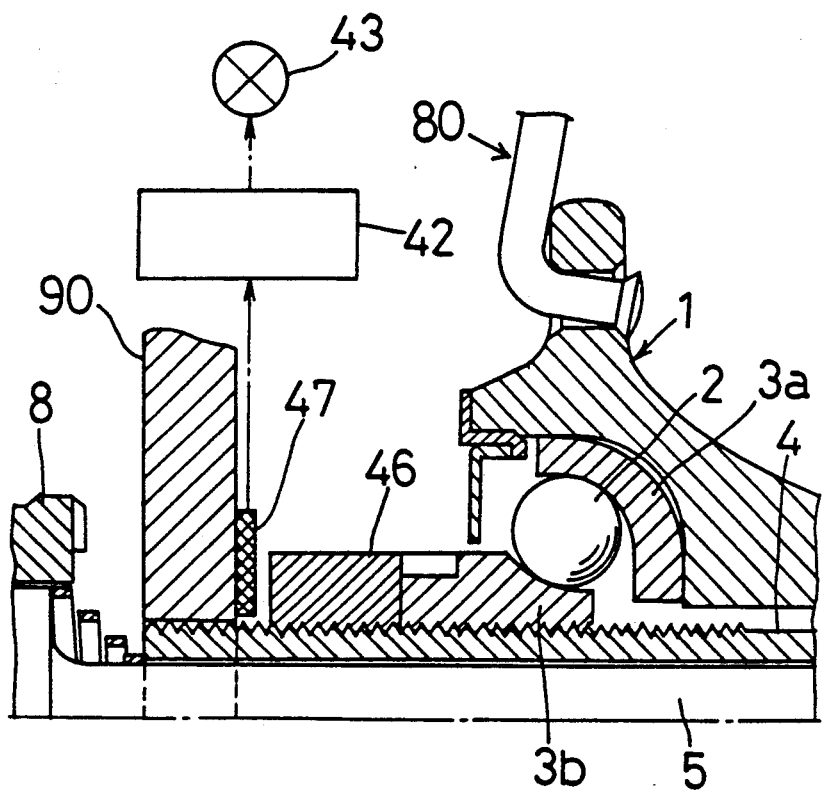
FIG. 11 is a sectional view of an indicating device of the quick release mechanism in a fifth embodiment of the present invention.

FIG. 11 shows a fifth embodiment including a pressure sensor 47 for detecting a contact pressure occurring with an increased tightening force between the fork 90 and an end face of an inner race locking element 46. In this way the tightening pressure by the first clamp 6 and second clamp 8 is detected, and a resulting pressure detection signal is transmitted to the evaluating device 42 for determining adequacy or inadequacy of the tightening condition. The warning device 43 is operable according to the result received from the evaluating device 42.

The quick release mechanism according to the present invention as described in relation to the various embodiments above is applicable for attaching a rear wheel as well as a front wheel. The described mechanism is also applicable to a quick release apparatus for tightening a saddle or the like, aside from wheels.

What is claimed is:

1. A quick release mechanism for tightening an object such as a bicycle component, comprising:
   a tightening rod extending axially;
   first clamp means mounted on one end of said tightening rod, and second clamp means mounted on the other end thereof, said first and second clamp means being axially movable relative to each other between a tightening position and a release position;

a control lever mounted on said tightening rod for moving said clamp means between said tightening position and said release position; and indicating means including displaceable pressure detecting means for detecting the tightening force applied to said object from said first and second clamp means; and a shift member that is shifted by a displacement of said displaceable pressure detecting means, said indicating means generating a warning signal when the tightening force is below a predetermined value.

2. A quick release mechanism as claimed in claim 1, wherein said object includes a frame fork and a hub assembly mounted between prongs of said frame fork to be rotatable about said tightening rod, and said indicating means is mounted on said tightening rod between said hub assembly and said frame fork, said indicating means including a contact member that rotates with said hub assembly, a receiving member for receiving the tightening force from said clamp means through said frame fork, wherein said shift member shifts between a position to contact said contacted member and a non-contact position, and said indicating means further includes an interlocking member for shifting said shift member to said non-contact position when said receiving member receives a force exceeding the predetermined value.

3. A quick release mechanism as claimed in claim 2, wherein
said shift member is shiftable axially.

4. A quick release mechanism as claimed in claim 3, wherein said shift member and said contact member have mutually contacting knurled portions for producing a sound with rotation of said hub assembly when said shift member is in said contact position.

5. A quick release mechanism as claimed in claim 2, wherein said shift member is shiftable radially.

6. A quick release mechanism as claimed in claim 2, wherein said shift member is oscillatable.

7. A quick release mechanism as claimed in claim 6, wherein said contacted member is at least one spoke of said bicycle and said shift member is a projection that contacts said spoke thereby sounding an audible warning signal when said shift member is in contact position.

8. A quick release mechanism as claimed in claim 2, wherein said indicating means further includes an electric pressure sensor, and said shift member is a switch that activates said electric pressure sensor.

9. A quick release mechanism as claimed in claim 2, wherein said contacted member is a bell, and said shift member is a hammer that strikes said bell when said shift member is in said contact position.

10. A quick release mechanism as claimed in claim 1, wherein said object includes a frame fork and a hub assembly mounted between prongs of said frame fork to be rotatable about said tightening rod, and said 5 indicating means is mounted on said tightening rod between said hub assembly and said frame fork, said indicating means including a shift member shiftable between a first position and a second position, a receiving member for receiving the tightening force 10 from said clamp means through said frame fork, an interlocking member for shifting said shift member to said second position when said receiving member receives a force exceeding the predetermined value, detecting means for detecting a shift to said second 15 position of said shift member, and a notifying device for giving a notification, through the medium of sound or light, based on a detection signal received from said detecting means.

* * * * *